United States Patent [19]

Uskali

[11] Patent Number: 5,717,936
[45] Date of Patent: Feb. 10, 1998

[54] DATA TERMINAL AND METHOD OF PROTECTING MEMORY ITEMS STORED IN NON-PERSISTENT MEMORY IN A DATA TERMINAL

[75] Inventor: Robert G. Uskali, Schaumbrg, Ill.

[73] Assignee: Motorola, Inc., Schaumburg, Ill.

[21] Appl. No.: 574,540

[22] Filed: Dec. 19, 1995

[51] Int. Cl.⁶ .................. G06F 1/30; G06F 1/32
[52] U.S. Cl. .................. 395/750; 395/182.12; 364/707; 365/228; 365/229; 307/66
[58] Field of Search .................. 395/750, 182.12; 365/228, 229; 307/64, 66, 85; 360/5; 340/825.16; 320/43, 39; 364/707

[56] References Cited

U.S. PATENT DOCUMENTS

| | | | |
|---|---|---|---|
| 3,980,935 | 9/1976 | Worst | 365/229 |
| 4,709,202 | 11/1987 | Koenck et al. | 320/43 |
| 4,845,419 | 7/1989 | Hacker | 320/39 |
| 4,874,960 | 10/1989 | Cybela | 307/64 |
| 5,115,182 | 5/1992 | Ehmke et al. | 320/14 |
| 5,396,637 | 3/1995 | Harwell et al. | 395/750 |
| 5,414,861 | 5/1995 | Horning | 395/750 |
| 5,437,040 | 7/1995 | Campbell et al. | 395/750 |
| 5,519,871 | 5/1996 | Shimoda | 395/750 |
| 5,535,399 | 7/1996 | Blitz et al. | 395/750 |

*Primary Examiner*—Gopal C. Ray
*Attorney, Agent, or Firm*—Hugh Dunlop; Gregg E. Rasor

[57] ABSTRACT

A data terminal, such as a personal digital assistant, personal computer, pager or other such device has a persistent memory (11), a non-persistent memory (12) including a memory item (15 or 16) and an indicator (17 or 18) indicating whether the memory item has been stored in the persistent memory. The data terminal has a power supply (29), a power fail detector (50) for detecting an imminent power failure in the power supply and a switching element (34) coupling the non-persistent memory (12) to the power supply. The switching element causes the power supply to supply power to the non-persistent memory when the indicator indicates that the second memory item has not been stored in the persistent memory and discontinues supply of power to the non-persistent memory when the power fail detector detects an imminent power failure and the indicator indicates that the second memory item has been stored in the persistent memory.

5 Claims, 2 Drawing Sheets

DATA TERMINAL AND METHOD OF PROTECTING MEMORY ITEMS STORED IN NON-PERSISTENT MEMORY IN A DATA TERMINAL

FIELD OF THE INVENTION

This invention relates to a data terminal such as a portable data terminal, personal digital assistant, personal computer, pager or other such device and it relates to protecting memory items stored in non-persistent memory in such a data terminal.

BACKGROUND OF THE INVENTION

In a personal computer or a personal digital assistant (PDA), memory is partitioned into persistent and transient (non-persistent) portions. Persistent memory retains its information stored independent of the operating mode of the device, for example, when the device is "off" or the main battery has been removed. Persistent memory can be implemented using read only memory (ROM), programmable ROM, electrically erasable programmable ROM (EEPROM), magnetic disc etc. or using battery backed-up static random access memory (SRAM) or dynamic random access memory (DRAM). Transient memory only retains its stored information during active operation of the device and is typically implemented with SRAM or DRAM.

In running an application in software (for example, a word processing program), it is common to perform a "save" operation from time to time. During a save operation, an information item such as an active file is "committed" by being stored in persistent memory. An "uncommitted" information item is one which has not been stored in persistent memory and is resident in transient memory.

It is advantageous to store active files in transient memory which is fast, has low power consumption and has a long life. It is a problem with transient memory that it requires a continuous power supply to maintain the stored information items.

Upon loss of power to the transient memory, any uncommitted information is lost. This may occur during emergency power conditions such as a main battery discharge.

Existing personal computers are known to provide warning messages when a bakery state detector detects an imminent power failure. The warning message allows the user sufficient time to manually perform a save operation (if desired) before the battery charge falls to such a low level that there is insufficient charge left to perform a save operation into persistent memory.

Sometimes, of course, the user may choose not to save uncommitted information upon being warned of a low battery condition, because this may involve over-riding of an earlier version of the file.

It is also a problem that certain types of persistent memory, such as battery backed-up SRAM or DRAM require a continuous supply of current to maintain their contents. In addition is frequently desirable, even in systems having persistent memory that does not draw current, to maintain power to selected circuits. It may be desirable, for example, to maintain power to a microprocessor system to avoid having to restart the microprocessor system upon re-establishment of power.

Devices are known in which the power supply to the transient memory is continued during a low-battery condition. Other functions are closed down (for example, a display) to conserve power and provide the user with an opportunity to plug a power cord into the device to replenish the battery charge. Such an arrangement is not wholly satisfactory because, even if a back-up battery protected power source is provided, the time available for the user to plug in the supply cord is reduced by the current consumption of the transient memory. Looked at another way, the active battery life before turning off the display is reduced because of the need to conserve power for the shut down period (or "sleep" period) during which the battery will continue to supply power to the transient memory.

There is a need for an improved electronic device with persistent and non-persistent memory.

DETAILED DESCRIPTION OF THE PREFERRED EMBODIMENT

Figure 1:
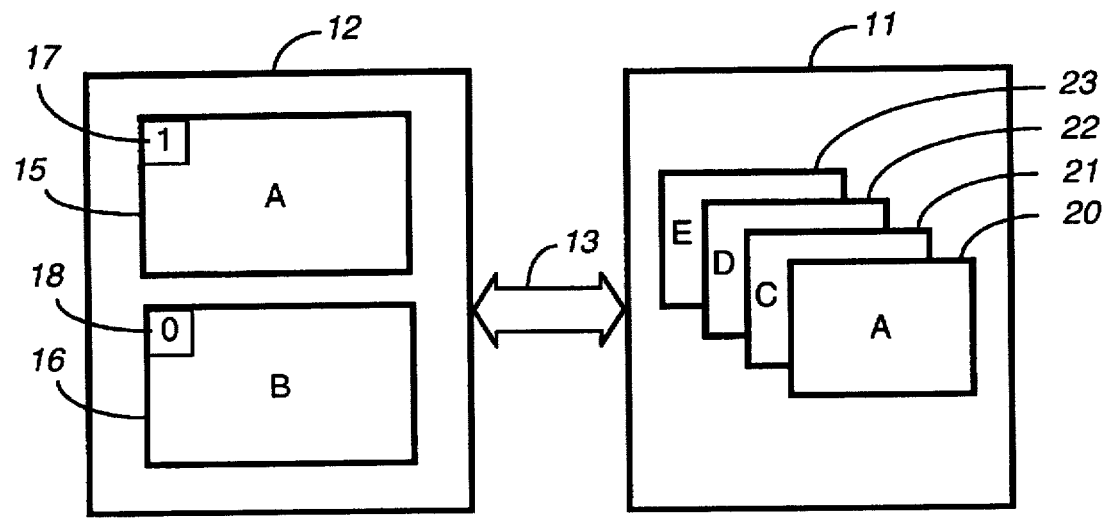
FIG. 1 is a sketch of persistent memory and non-persistent memory of a data terminal according to the preferred embodiment.

Referring to FIG. 1, a persistent memory 11 and a non-persistent (transient) memory 12 of a portable data terminal 10 (for example, a personal digital assistance) are shown. A data bus 13 couples the persistent memory 11 and the non-persistent memory 12. In the preferred embodiment the persistent memory is DRAM and the non-persistent memory is also DRAM, but other forms of persistent and non-persistent memory can be used such as those described above.

Stored in memory locations 15 and 16 in non-persistent memory 12 are two application files or similar information items A and B respectively. Each information item has an indicator which can be set to a first state (0) or a second state (1) indicating, respectively, that the information item is uncommitted or committed. Information item A in memory location 15 has indicator 17 set to the second state (1) indicating that it is committed, i.e. it has been stored in persistent memory 11. Information item B in memory location 16 has indicator 18 set to the first state (0), indicating that it is uncommitted, i.e. it has not been stored in persistent memory 11. It will be appreciated that other indicators can be stored with the information items A and B, for example, date and time stamps indicating the date and time that the information items were committed, but these need not be described in detail.

Also shown in persistent memory in FIG. 1 are memory locations 20, 21, 22 and 23, storing files or information items A, C, D, and E. It can be seen that memory location 20 contains a copy of information item A, i.e. it is the committed copy of information item A. It can be seen that information item B has not been copied into committed memory 11.

Figure 2:
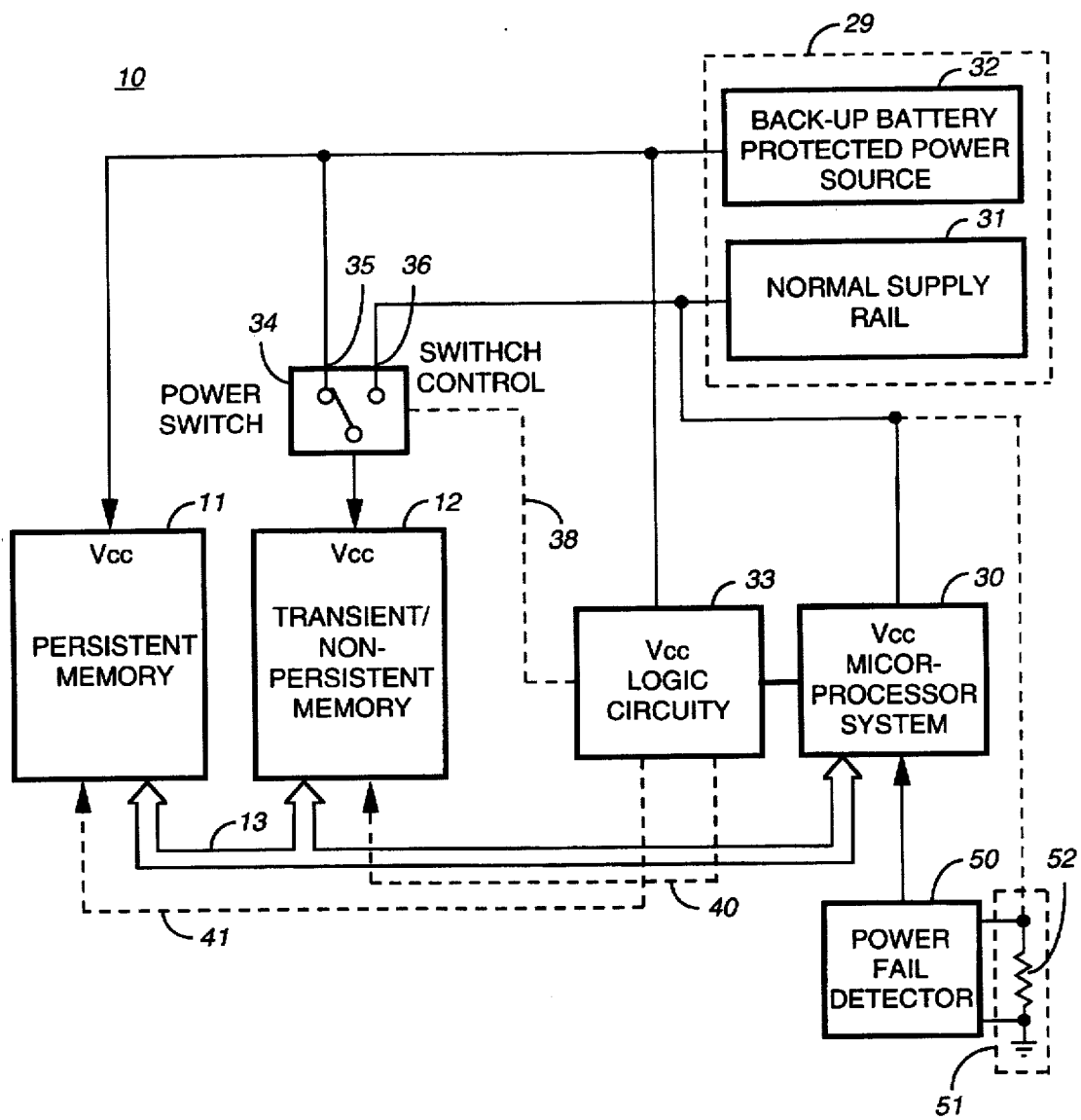
FIG. 2 is a block diagram of elements of the preferred embodiment of a data terminal in accordance with the invention, the device having a microprocessor system.

Referring now to FIG. 2, the data terminal 10 is shown as having persistent memory 11 and non-persistent memory 12, together with their connecting bus 13, which is also connected to a microprocessor system 30. The data terminal 10 also has a power supply 29 comprising a normal power supply raft 31 and a back-up battery protected power source 32, which may at the minimum be a battery. It will be appreciated that a single battery can perform the functions of power supply 29, or there may be a main battery included within normal power supply rail 31 and a separate back-up battery protected power source 32. These details are immaterial to the present invention.

Connected to the back-up battery protected power source 32 and the microprocessor system 30 is logic circuitry 33. Connected between the back-up battery protected power source 32 and the non-persistent memory 12 is a switching element 34. The switching element 34 is illustrated schematically as a two-way power switch having first and second terminals 35 and 36, but it will be appreciated that it is preferably implemented as a solid-state switching element. Terminal 35 is connected to the back-up battery protected power source 32. Terminal 36 is connected to the normal power supply rail 31. Non-persistent memory 12 has a Vcc power supply terminal 37. A switch control line 38 is shown between the logic circuitry 33 and the switching element 34. In the case where persistent memory 11 and non-persistent memory 12 are DRAM type memory, logic circuitry 33 provides refresh signals 40 and 41 to memories 12 and 11 respectively.

Associated with the microprocessor system 30 is a power fail detector 50.

Power fail detector 50 may take a number of forms. As an example, it may be an entirely software constructed detector such as a battery state detector or a circuit for monitoring the energy consumption of the device as described in U.S. Pat. No. 5,115,182 of Motorola, Inc. which patent is hereby incorporated by reference. Such a power fail detector is capable of detecting a low battery condition which is an indication of an imminent power fail state in the battery.

Alternatively, the power fail detector 50 may include a voltage sense circuit 51 coupled to the normal power supply rail 31 where the voltage sense circuit includes a high value resistor element 52 coupled between the normal power supply rail 31 and ground. In such an arrangement, the power fail detector 50 detects the voltage drop across the resistor element 52. The voltage drop is indicative of the state of the normal supply rail. If a suitable capacitor is present, a voltage drop can be measured which is indicative of imminent power failure.

Figure 3:
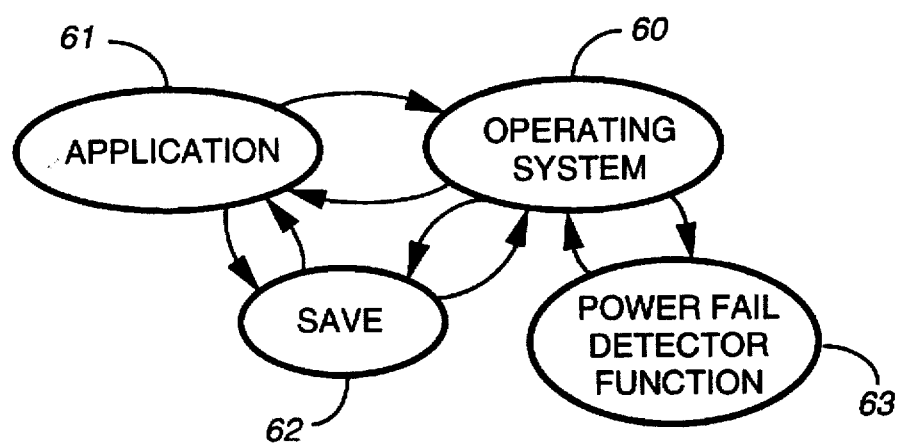
FIG. 3 is a process flow diagram illustrating processes performed by the microprocessor system of the terminal of FIG. 2.

Referring to FIG. 3, it can be seen that the microprocessor system has an operating system 60 and performs application functions 61 as well as save functions 62 and a power fail detector function 63.

In normal operation, as has been described with reference to FIG. 1, the application functions 61 are performed by the user and from time to time a save function 62 is activated, whereby an information item such as information item A stored in memory location 15 of FIG. 1 is committed and transferred across bus 13 into persistent memory 11 to provide committed information item A stored in memory location 20. During these operations, the switching element 34 is switched to its notional right hand position such that the non-persistent memory 12 has its Vcc power supply terminal 37 corrected to switch terminal 36 to draw electric power from the normal power supply rail 31. Normal power supply rail 31 may derive power from a primary battery or from a transformer connected to a mains supply (not shown). The power fail detector is arranged appropriately for the type of normal power supply rail. For example, in the case of a primary battery, power fail detector can be a charge counting arrangement as has been described. In the case of a transformer, a voltage sensing circuit such as circuit 51 is more appropriate. In either case, in the event of a power fail state in the normal supply rail, either through the power fail detector determining that the primary battery state is low (i.e. an imminent power failure) or the voltage sensing circuit 51 determining that the normal supply rail voltage has fallen below a threshold, this indication is given by the power fail detector 50 to the microprocessor system 30 and then to the logic circuitry 33.

Consider the case where, information item A is committed to persistent memory as shown in FIG. 1 by operation of save function 62 and, through further operation of the application functions 61, information item B is created from information item A (or is created independent of information item A), whereupon power fail detector 50 detects a power fail state.

Logic circuitry 33, which draws power from the back-up battery protected power source 32, operates as follows. Logic circuitry 33 provides power to the microprocessor system 30 for just sufficient time to determine whether there exists in non-persistent memory 12 any information item (for example, information item B) having its indicator (for example, indicator 18) set in the first state (0). If such an information item exists, as illustrated in FIG. 1, logic circuitry 33 causes power switching element 34 to switch from the notional right-hand position to the notional left-hand position as shown, at which notional position back-up battery protected power source 32 provides power to Vcc power supply terminal 37 of non-persistent memory 12. In this manner, the uncommitted information item B is retained in the non-persistent memory 12. Logic circuitry 33 is then able to switch off the microprocessor system 30 and any associated peripherals, such as a display or a radio modem (not shown).

Alternatively, if logic circuitry 33 determines from microprocessor system 30 that there is no file in non-persistent memory 12 having its indicator set in the first state (or that all existing files have their indicators set in the second state), logic circuitry 33 maintains power switching element 34 in the notional right hand position as shown, such that non-persistent memory 12 does not draw current from back-up battery protected power source 32. In this case, only persistent memory 11 continues to draw current from the back-up battery protected power source 32 and hence the period during which persistent memory 11 can continue to maintain its files is significantly extended.

The arrangement has the distinct advantage that a user can periodically perform a save operation 62 to commit files to persistent memory in the knowledge that doing so has a significant effect in terms of extending the life of protection of files or information items stored in persistent memory. At the same time, the arrangement provides protection for files or information items stored in non-persistent memory in situations where the user has been unable to perform a save operation 62. This gives the user time to plug in a power cord to re-establish normal supply rail 31 or to recharge the primary battery without losing uncommitted files or information items.

The arrangement increases the safety of storage of files or information items in different scenarios.

It has been described how information item A is committed to persistent memory by being transferred from memory location 15 to memory location 20 and it has been described how a new information item B is created in non-persistent memory with its own indicator 18. It will of course be understood that new information item B could be overwritten in memory location 15, in which case, instead of providing indicator 18, indicator 17 can be changed from the second state (1) to the first state (0) indicating that the information item (or file) now stored in memory location 15 is an uncommitted information item. These operations are performed by the operating system 60.

Thus there has been described, in a data terminal 10 having a persistent memory 11, a non-persistent memory 12, a power supply 29, a power fail detector 50 and a switching element 34 coupling the power supply to the non-persistent memory, a method of protecting memory items stored in non-persistent memory. The method comprises the steps of: storing an information item (item A or item B) in the non-persistent memory 12; providing a first indication (17 or 18; state "0") that the information item has not yet been transferred to the persistent memory; selectively transferring, by save function 62, the information item (e.g. item A) to the persistent memory 11 and substantially simultaneously providing a second indication (17; state "1") that the information item (item A) has been stored in persistent memory; detecting a power fail state in the power supply by operation of power fail detector function 63; and selectively causing the switching element 34 to supply electric power to the non-persistent memory 12 when the power fail detector detects the power fail state and the first indication (18; state "0") is provided.

What is claimed is:

1. A data terminal comprising:

a persistent memory for persistent storage of user information items;

a non-persistent memory for temporary storage of user information items, the non-persistent memory being coupled to the persistent memory and including at least a first information item and an indicator indicating whether the first information item has been stored in the persistent memory;

a power supply supplying power to the data terminal, the power supply comprising a power supply rail and a battery;

a power fail detector responsive to the power supply rail for detecting a power fail state in the power supply rail; and a switching element connected between the battery and the non-persistent memory and responsive to the indicator in the non-persistent memory to selectively couple the battery to the non-persistent memory and to selectively cause the battery to supply power to the non-persistent memory dependent on the indicator and on the power fail detector.

2. A data terminal comprising:

a persistent memory for persistent storage of user information items;

a non-persistent memory for temporary storage of user information items, the non-persistent memory being coupled to the persistent memory and including at least a first information item and an indicator indicating whether the first information item has been stored in the persistent memory;

a battery;

a power fail detector responsive to the battery for detecting an imminent power fail state in the battery; and a switching element connected between the battery and the non-persistent memory and responsive to the indicator in the non-persistent memory to selectively couple the battery to the non-persistent memory and to selectively cause the battery to supply power to the non-persistent memory dependent on the indicator and on the power fail detector.

3. A data terminal comprising:

a persistent memory for persistent storage of user information items;

a non-persistent memory for temporary storage of user information items, the non-persistent memory being coupled to the persistent memory and including a first information item and an indicator indicating whether the first information item has been stored in the persistent memory;

a power supply supplying power to the data terminal;

a power fail detector for detecting a power fail state in the power supply; and a switching element coupling the non-persistent memory to the power supply for causing the power supply to supply power to the non-persistent memory when the indicator indicates that the first information item has not been stored in the persistent memory and for discontinuing supply of power to the non-persistent memory when the power fail detector detects a power fail state and the indicator indicates that the first information item has been stored in the persistent memory.

4. A data terminal comprising:

persistent memory for storing user data, the persistent memory including a first memory location;

non-persistent memory for storing user data, the non-persistent memory including a second memory location and an indicator associated with the second memory location;

logic circuitry coupled to the persistent memory and the non-persistent memory for selectively causing an information item to be transferred from the second memory location to the first memory location and to cause the indicator to indicate that the information item has been transferred;

a battery coupled to the logic circuitry, the persistent memory and the non-persistent memory;

a battery state detector coupled to the battery for detecting a low battery condition in the battery; and a switching element coupled to the battery, the non-persistent memory and the logic circuitry and responsive to the battery state detector for causing the battery to supply electric power to the non-persistent memory when the battery state detector detects a low battery condition and the indicator indicates that the information item has not been transferred to the persistent memory and for causing the battery not to supply electric power to the non-persistent memory when the battery state detector detects a low battery condition and the indicator indicates that the information item has been transferred to the persistent memory.

5. In a data terminal having a persistent memory, a non-persistent memory, a power supply, a power fail detector and a switching element coupling the power supply to the non-persistent memory, a method of protecting memory items stored in non-persistent memory comprising the steps of:

storing an information item in the non-persistent memory;

providing a first indication in the non-persistent memory that the information item has not yet been transferred to the persistent memory;

selectively transferring the information item to the persistent memory and substantially simultaneously providing a second indication in the non-persistent memory that the information item has been stored in persistent memory;

detecting an imminent power fail state in the power supply; and when the power fail detector detects the imminent power fail state, selectively causing the switching element to continue to supply electric power to the non-persistent memory only when the first indication is provided in the non-persistent memory.

* * * * *